United States Patent
Dworakowski et al.

(10) Patent No.: US 10,776,953 B2
(45) Date of Patent: Sep. 15, 2020

(54) METHOD FOR IDENTIFICATION OF CANDIDATE POINTS AS POSSIBLE CHARACTERISTIC POINTS OF A CALIBRATION PATTERN WITHIN AN IMAGE OF THE CALIBRATION PATTERN

(71) Applicant: Aptiv Technologies Limited, St. Michael (BB)

(72) Inventors: Waldemar Dworakowski, Cracow (PL); Rafal Dlugosz, Poznan (PL); Krzysztof Gongolewski, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 85 days.

(21) Appl. No.: 15/779,880

(22) PCT Filed: Nov. 17, 2016

(86) PCT No.: PCT/EP2016/078011
§ 371 (c)(1),
(2) Date: May 30, 2018

(87) PCT Pub. No.: WO2017/093037
PCT Pub. Date: Jun. 8, 2017

(65) Prior Publication Data
US 2018/0322656 A1 Nov. 8, 2018

(30) Foreign Application Priority Data

Nov. 30, 2015 (EP) .................................. 15196965

(51) Int. Cl.
*G06K 9/00* (2006.01)
*G06T 7/80* (2017.01)
(Continued)

(52) U.S. Cl.
CPC .................. *G06T 7/80* (2017.01); *G06T 7/70* (2017.01); *G06T 7/73* (2017.01); *G06T 2207/30204* (2013.01); *G06T 2207/30208* (2013.01)

(58) Field of Classification Search
CPC .. G06T 7/80; G06T 7/73; G06T 5/001; G06T 5/20; G06T 5/50; G06T 2207/30204;
(Continued)

(56) References Cited

U.S. PATENT DOCUMENTS 6,292,171 B1 * 9/2001 Fu .......................... G06F 3/0386
345/156
6,915,072 B2 * 7/2005 Takahashi .............. G03B 13/04
396/296
(Continued)

OTHER PUBLICATIONS

Bay H et al: "Speeded-Up Robust Features (SURF)", Jun. 1, 2008, pp. 346-359.

*Primary Examiner* — Amir Alavi
(74) *Attorney, Agent, or Firm* — Colby Nipper PLLC

(57) ABSTRACT

A method for identification of candidate points as possible characteristic points of a calibration pattern within an image of the calibration pattern includes the steps of determining spots within a filtered image de-rived from the image of the calibration pattern, with a spot being defined as a coherent set of pixels of the filtered image having pixel values exceeding a threshold; for each determined spot, calculating a central point of the determined spot; and identifying as candidate points all calculated central points.

20 Claims, 2 Drawing Sheets

(51) Int. Cl.
*G06T 7/70* (2017.01)
*G06T 7/73* (2017.01)

(58) Field of Classification Search
CPC .................................................. G06K 9/40;
G06K 9/72; G06K 9/202; G06K 9/222;
G06K 9/2011; H04N 5/21
See application file for complete search history.

(56) References Cited

U.S. PATENT DOCUMENTS

| | | | | |
|---|---|---|---|---|
| 8,295,588 | B2* | 10/2012 | Fujieda | G06K 9/00 |
| | | | | 382/118 |
| 9,122,267 | B2* | 9/2015 | Morita | G05B 19/4061 |
| 9,319,667 | B2* | 4/2016 | Lin | H04N 17/002 |
| 9,441,958 | B2* | 9/2016 | Hara | G06T 7/80 |
| 9,739,603 | B2* | 8/2017 | Hara | G01B 11/2504 |
| 10,218,961 | B2* | 2/2019 | Kishiwada | H04N 13/239 |
| 2008/0170228 | A1* | 7/2008 | Jiang | H04N 17/002 |
| | | | | 356/416 |
| 2009/0231374 | A1* | 9/2009 | Van de Wynckel | B41J 2/2135 |
| | | | | 347/12 |
| 2010/0232681 | A1 | 9/2010 | Fujieda et al. | |
| 2018/0322656 | A1* | 11/2018 | Dworakowski | G06T 7/80 |
| 2018/0357509 | A1* | 12/2018 | Dlugosz | G06K 9/3233 |

* cited by examiner

METHOD FOR IDENTIFICATION OF CANDIDATE POINTS AS POSSIBLE CHARACTERISTIC POINTS OF A CALIBRATION PATTERN WITHIN AN IMAGE OF THE CALIBRATION PATTERN

TECHNICAL FIELD OF INVENTION

The invention relates to a method for identification of candidate points as possible characteristic points of a calibration pattern within an image of the calibration pattern.

BACKGROUND OF INVENTION

Such a calibration pattern can for example be used for calibrating the orientation of a camera mounted to a vehicle. The image of the calibration pattern is then acquired by means of this camera. Especially for such a calibration, but also for different possible purposes in different contexts, it can be necessary to identify characteristic points of the calibration pattern within the image of the calibration pattern. Such characteristic points, however, might not be identifiable by a single procedure or a single criterion. Therefore, it might be useful to first identify candidate points having some necessary characteristics of the characteristic points to be identified, with these characteristics, however, not being sufficient for reliable identification of the "true" characteristic points of the calibration pattern. As a result, the candidate points ideally comprise all characteristic points to be identified, though they might also comprise other points only resembling characteristic points to a certain extent.

The method for identification of such candidate points as possible characteristic points of the calibration pattern does not necessarily have to be executed on the image as directly obtained photographically from the calibration pattern. Instead the image might be preprocessed, for example, in a manner such that it is better adapted to be searched for candidate points.

In particular, candidate points can be characterized by an at least local maximum or minimum of pixel values of pixels of the image. Preferably, the resolution of the image is such that a possible characteristic point of the calibration image is represented in the image by an area comprising several pixels. The pixel values of this area might then form an elevation or a depression compared to the pixel values of surrounding pixels. To find such an elevation or depression, the pixel value of each of the pixels of the image could be compared to a threshold, with the location of a candidate point being, for example, determined as an apex of a found elevation or depression. However, due to noise or other errors in the image, identifying as candidate points all pixels having a locally maximal or minimal pixel value and/or being the apex of a pixel value elevation or depression could lead to too many false positives.

SUMMARY OF THE INVENTION

It is an objective of the invention to identify the candidate points in an alternative and, in particular, more specific manner and, preferably, with better resolution.

The objective is solved by a method in accordance with claim 1.

The method comprises determining spots within a filtered image derived from the image of the calibration pattern, with a spot being defined as a coherent set of pixels of the filtered image having pixel values exceeding a threshold. In other words, instead of directly searching for individual pixels having features characterizing them as possible characteristic points of the calibration pattern, the filtered image is preferentially searched for spots, i.e. regions of the image which might be indicative of a characteristic point. Such regions comprise pixels with pixel values exceeding a threshold, whereas the pixel values of the pixels surrounding a respective spot in particular do not exceed the threshold. The threshold can be an upper or a lower threshold. Therefore, in the one case, the pixels of the spot exceeding the threshold can all have pixel values above the threshold, and in the alternative case, they can all have pixel values below the threshold.

The filtered image might be identical to the image of the calibration pattern, if the calibration pattern is such that the image of the calibration pattern directly comprises spots indicative of characteristic points of the calibration pattern. However, it may be necessary preprocess the image in of the calibration pattern in some way, especially by filtering, in order to create the spots from which respective characteristic points can then be derived. This will be explained exemplarily in greater detail below.

After the spots have been determined, for each of the determined spots, a central point of the determined spot is calculated which is then identified as candidate point. In particular, for every spot determined one candidate point is obtained in this way.

According to an embodiment, the step of determining the spots comprises scanning the filtered image one pixel of the filtered image after another, wherein, if a scanned pixel has a pixel value exceeding the threshold, the scanning is paused and a spot contour tracing is executed starting with the last scanned pixel as current pixel and the second last scanned pixel as previous pixel. In this respect, determining the spots is an iterative procedure. The filtered image is scanned pixel by pixel until a pixel is reached having a pixel value exceeding the threshold. Then, from this pixel on, a contour of a respective spot can be traced by a spot contour tracing algorithm. In this way, a spot in the filtered image can be identified by tracing the spot at least essentially along a border between pixels having pixel values exceeding the threshold and pixels having pixel values not exceeding the threshold.

As starting values for such a spot contour tracing algorithm, the last scanned pixel, i.e. the pixel having a pixel value exceeding the threshold and having caused the execution of the spot contour tracing, is regarded as the first "current pixel", and the second last scanned pixel, which consequently has a pixel value not exceeding the threshold, is regarded as the first "previous pixel".

In particular, said spot contour tracing comprises a tracing step as a result of which the current pixel is logged as a contour pixel of the spot and a new current pixel is determined, wherein this tracing step is repeated until the current pixel is again equal to the last scanned pixel. In other word, the tracing step is repeated until the starting point is reached and thus the contour is closed.

The tracing step in particular comprises logging the current pixel as a contour pixel; for neighboring pixels adjacent to the current pixel, evaluating the condition, whether both the neighboring pixel has a pixel value exceeding the threshold and another neighboring pixel, which immediately precedes this neighboring pixel with respect to a sense of rotation around the current pixel, has a pixel value not exceeding the threshold; selecting from all neighboring pixels, for which the condition is fulfilled, the neighboring pixel farthest from the previous pixel with respect to said sense of rotation; and defining the current pixel as (new) previous pixel as well as defining the selected neighboring pixel as (new) current pixel. Hence, in a single tracing step, the spot contour tracing algorithm moves from one pixel having a pixel value exceeding the threshold to a neighboring pixel also having a pixel value exceeding the threshold.

To select the neighboring pixel to move to next, in particular all neighboring pixels of the current pixel are evaluated. A neighboring pixel to the current pixel is preferentially a pixel with direct contact to the current pixel. A direct contact can comprise a common border which can be line or also only a single point. Hence, in a field of pixels arranged in rows and columns, a pixel has eight neighboring pixels having contact to the pixel at one of the pixel's four sides or at one of the pixel's four corners, respectively.

The selected neighboring pixel to the respective current pixel, on the one hand, has to have a pixel value exceeding the threshold and, on the other hand, has to be near the border between pixels with pixel values exceeding the threshold and pixels with pixel values not exceeding the threshold. Therefore it is preferred to evaluate the neighboring pixels along a sense of rotation around the current pixel, for example clockwise or counter-clockwise, and to compare the pixel value of a respective one of the neighboring pixels with the pixel value of the immediately preceding one of the neighboring pixels with respect to said sense of rotation.

If for one current pixel more than one neighboring pixel is found whose pixel value exceeds the threshold and whose preceding neighboring pixel has a pixel value not exceeding the threshold, the latest such neighboring pixel is selected. By this the sense of rotation of the spot contour tracing is defined and corresponds to said sense of rotation of successively evaluating the neighboring pixels of a respective current point.

After a tracing the spot contour has been completed, i.e. after repeating the tracing step has stopped because the last scanned pixel has been reached again, the spot is identified as the set of pixels which comprises the logged contour pixels and the pixels encircled by the logged contour pixels. From this set of pixels the central point of the spot can then be calculated.

Afterwards the next spot can be searched and its contour can then be traced. To this purpose, an already found spot is preferentially removed at least temporarily from the filtered image so that it is not traced multiple times during the scanning of the filtered image.

In an embodiment, calculating the central point of a determined spot comprises the steps of determining a first coordinate of the central point by calculating the sum of the products of a respective first coordinate and a respective pixel value of each of the pixels of the spot and dividing this sum by the sum of the pixel values of the pixels of the spot, and determining a second coordinate of the central point by calculating the sum of the products of a respective second coordinate and a respective pixel value of each of the pixels of the spot and dividing this sum by the sum of the pixel values of the pixels of the spot. Such calculation can be regarded as determining the central point as a weighted average of all the points of the respective spot.

In such an embodiment, the central point is not simply that one of the pixels of the spot having a maximal or minimal value or simply an apex of the spot, but is dependent on the pixel values of all pixels of the spot. By this, determining the central point of a spot is less prone to errors due to noise. Furthermore, the central point is determined with sub-pixel precision, because due to the weighted averaging the resulting position of the central point is not limited to exact pixel positions. Other methods for calculating the central spot than a weighted averaging as defined above might be used alternatively.

According to an embodiment, the filtered image is derived from a smoothed image obtained from the image of the calibration pattern by, for each pixel of the image of the calibration pattern, replacing a pixel value of the pixel by an average over the pixel values of pixels in a vicinity of the pixel. This can in particular correspond to box filtering or moving average filtering of the image. The degree of smoothing especially depends on the definition of said vicinity of the respective pixel and is preferably adjusted such that image noise can be reduced significantly while the calibration pattern remains clearly recognizable.

In an embodiment, the filtered image is obtained from the image of the calibration pattern or a smoothed image derived from the image of the calibration pattern by convolution of the image or the smoothed image, respectively, with a filter kernel specific to the calibration pattern or to a sub-pattern of the calibration pattern. Such a convolution is especially suited to result in a filtered image in which the calibration pattern or the sub-pattern stands out from the rest of the filtered image, whereas parts of the image not corresponding to the calibration pattern or the sub-pattern, for example a background, can ideally be smoothed out.

In particular, the convolution of the image or the smoothed image comprises the steps of obtaining an integral image from the image or the smoothed image by, for each pixel of the image or the smoothed image, replacing the pixel value of the respective pixel by the sum of the pixel values of pixels having smaller first and second coordinates than the respective pixel; and convolving the integral image with a modified filter kernel specific to the calibration pattern or to the sub-pattern of the calibration pattern. In other word, the convolution of the image or smoothed image with a filter kernel can be replaced by a convolution of the integral image of the image the smoothed image with a modified filter, wherein the modified filter kernel is preferably chosen such that the result of the convolution remains the same. By this, computing power and time may be reduced substantially, because calculation of the integral image requires only additions and the modified kernel can be much simpler than the unmodified filter kernel. Especially, a majority of the coefficients of the modified filter kernel can become zero so that comparatively few products have to be calculated for the convolution. If the non-zero coefficients of the modified filter kernel are one or minus one, the convolution might be even further simplified to only a few additions.

According to an embodiment, the calibration pattern comprises a sub-pattern formed by two equally oriented squares contrasting with a background of the calibration pattern, with a corner of one of the squares coinciding with a corner of the other of the squares. This can be regarded as a checkerboard with two rows and two columns. Especially, the squares can at least essentially be black on a white background. A characteristic point of such a sub-pattern may then be the center of the sub-pattern where the corners of the two squares coincide.

If the calibration contains such a sub-pattern, in a further embodiment, the filter kernel comprises a field of kernel values corresponding to said sub-pattern by the kernel value of a point of the field being equal to one, if the point corresponds to any of the squares of the sub-pattern, and equal to zero otherwise. In other words, for the sub-pattern described the filter kernel can also be checkerboard-like, with two rows and two columns and the "dark" fields of the checkerboard having kernel values of one and the "light" fields of the checkerboard having kernel values of zero.

In such an embodiment, the modified filter kernel preferably comprises a field of kernel values corresponding to said sub-pattern by the kernel value of a point of the field being: equal to one, if the point corresponds to a corner of any of the squares and the sum of first and second coordinates of the corner is smaller or greater than each sum of first and second coordinates of the other corners of the same square; equal to minus one, if the point corresponds to a corner of any of the squares and the sum of first and second coordinates of the corner is neither smaller nor greater than each sum of first and second coordinates of the other corners of the same square; and equal to zero otherwise.

In other words, only in the corners of the squares the modified kernel has non-zero kernel values. The kernel values in the corners are one or minus one, with kernel values of one in the upper left corner and in the lower right corner and of minus one in the other corners, or vice versa.

With the described sub-pattern in the calibration pattern, convolution of the image or smoothed image of the calibration pattern using the filter kernel or convolution of the integral image using the modified filter kernel can lead to a filtered image, in which the corners of said squares of the sub-pattern appear as spots comprising pixels having higher pixel values than the other pixels of the filtered image. Therefore such convolution is especially suited to preprocess the image of the calibration pattern for a subsequent determination of these spots within the filtered image by the spot contour tracing described above.

According to an alternative embodiment, the calibration pattern is an arrangement of sub-patterns comprising at least a first sub-pattern and a second sub-pattern. In particular the second sub-pattern is an inverse of the first sub-pattern. For example, the second sub-pattern can be bright or white, where the first sub-pattern is dark or black, and vice versa.

With such a calibration pattern, the filtered image can in particular be obtained from the image of the calibration pattern or a smoothed image derived from the image of the calibration pattern by convolution of the image or the smoothed image with a filter kernel specific to a superposition of the first sub-pattern and the second sub-pattern; and after convolution, for each pixel of the image or the smoothed image, replacing a pixel value of the pixel by the absolute value of the pixel value.

This is similar to the method according to an embodiment described above. However, the filter kernel is now specific to a superposition of the first sub-pattern and the second sub-pattern. For example, the filter kernel can be formed by subtraction of a filter kernel specific to the second sub-pattern from a filter kernel specific to the first sub-pattern. By this, the filter kernel can be usable for detecting both the first sub-pattern and the second sub-pattern at the same time. However, such a filter kernel can lead to spots in the filtered image corresponding to first sub-patterns of the calibration pattern having high positive pixel values and spots corresponding to second sub-patterns of the calibration pattern having high negative pixel values. To be able to use a single threshold for detecting all these spots, it can be preferred that, after convolution, all pixels of the convolved image have their pixel values replaced by the respective absolute values of the pixel values. In this way, all spots have positive values independent of whether they correspond to the first or the second sub-pattern.

In particular, the convolution of the image or the smoothed image comprises the steps of obtaining an integral image from the image or the smoothed image by, for each pixel of the image or the smoothed image, replacing a pixel value of the pixel by the sum of the pixel values of pixels having smaller first and second coordinates than the pixel; and convolving the integral image with a modified filter kernel specific to the superposition of the first sub-pattern and the second sub-pattern. As described above for another embodiment, such a convolution can be advantageous with respect to the computation power and time.

According to an embodiment, each of the first and second sub-patterns is formed by two equally oriented squares contrasting with a background of the calibration pattern, with a corner of one of the squares coinciding with a corner of the other of the squares, wherein the relative orientation of the two squares of the first sub-pattern is perpendicular to the relative orientation of the two squares of the second sub-pattern. In particular, the sub-patterns can be similar to the sub-pattern described above. However, with respect to each other the first and second sub-patterns differ in particular in the relative orientation of the two squares. Especially, the two sub-pattern can be checkerboard-like with two rows and two columns each, wherein in the first sub-pattern, for example, the top left field and the bottom right field are dark or black and the other fields are bright or white, and in the second sub-pattern the top right field and the bottom left field are dark or black and the other filed are bright or white.

If the calibration contains first and second sub-patterns of the described kind, in an embodiment, the filter kernel comprises a field of kernel values corresponding to the superposition of the first sub-pattern and the second sub-pattern by the kernel value of a point of the field being: equal to one, if the point corresponds to any of the squares of the first sub-pattern; equal to minus one, if the point corresponds to any of the squares of the second sub-pattern; and equal to zero otherwise.

In such an embodiment, the modified filter kernel preferably comprises a field of kernel values corresponding to the superposition of the first sub-pattern and the second sub-pattern by the kernel value of a point of the field being: equal to one, if the point corresponds to a corner of any of the squares of the first sub-pattern and the sum of first and second coordinates of the corner is smaller or greater than each sum of first and second coordinates of the other corners of the same square; equal to minus one, if the point corresponds to a corner of any of the squares of the first sub-pattern and the sum of first and second coordinates of the corner is neither smaller nor greater than each sum of first and second coordinates of the other corners of the same square; equal to minus one, if the point corresponds to a corner of any of the squares of the second sub-pattern and the sum of first and second coordinates of the corner is smaller or greater than each sum of first and second coordinates of the other corners of the same square; equal to one, if the point corresponds to a corner of any of the squares of the second sub-pattern and the sum of first and second coordinates of the corner is neither smaller nor greater than each sum of first and second coordinates of the other corners of the same square; and equal to zero otherwise.

In other words, the modified kernel has non-zero kernel values only in corners of the checkerboard fields. In these corners the kernel values are one or minus one, wherein for the "dark" fields of the checkerboard the kernel values in the upper left corner and in the lower right corner are one and the kernel values in the other corners are minus one, and wherein for the "bright" fields of the checkerboard the kernel values in the upper right corner and in the lower left corner are one and the kernel values in the other corners are minus one, or vice versa.

Such a filter kernel or modified kernel can then be suited for determining both first sub-patterns and second sub-patterns within the image or smoothed image at the same time. In particular, such kernels can be able to transform corners of the squares of a respective sub-pattern to respective spots of pixels whose pixel values stand out from the pixel values of surrounding pixels.

The objective of the invention is furthermore solved by a computer program product in accordance with claim 16 and in particular by a computer program product with a computer program which has software means for carrying out a method in accordance with at least one of the embodiments described above, if the computer program is executed in a computing device. Due to the preferably low complexity of the calculations during execution of the method, the computer program may especially be suited to be executed on a microcontroller or an embedded system of a camera with which the image of the calibration pattern is acquired.

BRIEF DESCRIPTION OF DRAWINGS

In the following, the invention is exemplarily further described with reference to the Figures.

DETAILED DESCRIPTION

Figure 1:
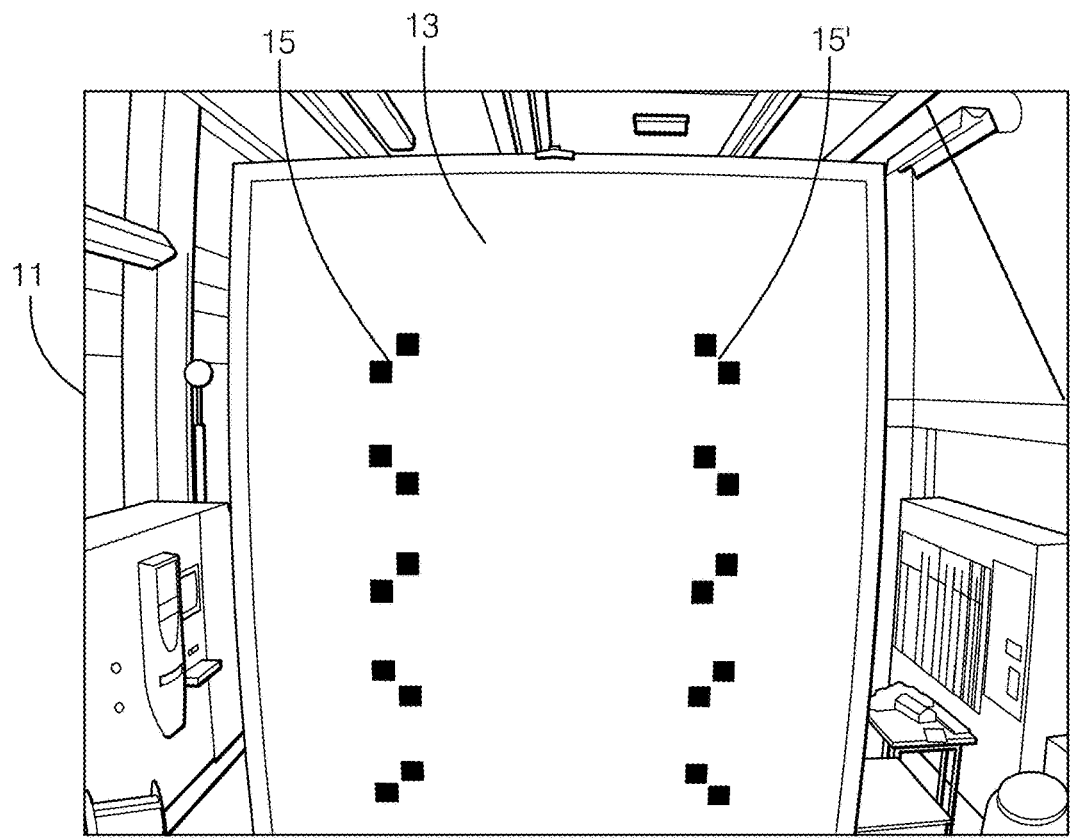
FIG. 1 is a calibration pattern for calibrating a camera in accordance with one embodiment.

FIG. 1 shows an exemplary image 11 of a calibration pattern 13 acquired with a camera which is not shown. The calibration pattern 13 comprises ten sub-patterns 15, 15', representations of which can be recognized in the image 11. There are sub-patterns of a first type 15 and sub-patterns of a second type 15'. The sub-patterns 15, 15' of both types are each formed by two equally oriented squares, with a corner of one of the squares coinciding with a corner of the other of the squares, wherein the relative orientation of the two squares of a respective sub-patterns of the first type 15 is perpendicular to the relative orientation of the two squares of a respective sub-pattern of the second type 15'.

Five of the sub-patterns 15, 15' are arranged along a first vertical line, the other five along a second vertical line. Each of the sub-patterns 15, 15' on the first vertical line forms a pair with a respective sub-pattern 15, 15' on the second vertical line such that both sub-patterns 15, 15' of a respective pair are aligned on a horizontal line. Hence, in total there are five horizontal lines. While the two vertical lines and the five horizontal lines are not depicted and hence are no explicit part of the calibration pattern, they are unambiguously defined by the sub-patterns 15, 15', in particular by respective characteristic points of these sub-patterns 15, 15'.

For example to use the horizontal lines and the vertical lines for calibrating an orientation of the camera, the characteristic points of the calibration pattern 13 are to be determined. For this, the image 11 can be convolved with a filter kernel k having the following kernel values:

$$k = \begin{bmatrix} 1 & 1 & \ldots & 1 & 1 & 0 & 0 & \ldots & 0 & 0 \\ 1 & 1 & \ldots & 1 & 1 & 0 & 0 & \ldots & 0 & 0 \\ \vdots & \vdots & \ddots & \vdots & \vdots & \vdots & \vdots & \ddots & \vdots & \vdots \\ 1 & 1 & \ldots & 1 & 1 & 0 & 0 & \ldots & 0 & 0 \\ 1 & 1 & \ldots & 1 & 1 & 0 & 0 & \ldots & 0 & 0 \\ 0 & 0 & \ldots & 0 & 0 & 1 & 1 & \ldots & 1 & 1 \\ 0 & 0 & \ldots & 0 & 0 & 1 & 1 & \ldots & 1 & 1 \\ \vdots & \vdots & \ddots & \vdots & \vdots & \vdots & \vdots & \ddots & \vdots & \vdots \\ 0 & 0 & \ldots & 0 & 0 & 1 & 1 & \ldots & 1 & 1 \\ 0 & 0 & \ldots & 0 & 0 & 1 & 1 & \ldots & 1 & 1 \end{bmatrix}$$

The size of the filter kernel is specifically adapted at least approximately to the size (in pixels) of the representations of the first sub-patterns 15 in the image 11.

Alternatively, the integral image of the image 11 can be calculated, which is then convolved with a modified filter kernel k' having the following kernel values:

$$k' = \begin{bmatrix} 1 & 0 & \ldots & 0 & -1 & 0 & 0 & \ldots & 0 & 0 \\ 0 & 0 & \ldots & 0 & 0 & 0 & 0 & \ldots & 0 & 0 \\ \vdots & \vdots & \ddots & \vdots & \vdots & \vdots & \vdots & \ddots & \vdots & \vdots \\ 0 & 0 & \ldots & 0 & 0 & 0 & 0 & \ldots & 0 & 0 \\ -1 & 0 & \ldots & 0 & 1 & 0 & 0 & \ldots & 0 & 0 \\ 0 & 0 & \ldots & 0 & 0 & 1 & 0 & \ldots & 0 & -1 \\ 0 & 0 & \ldots & 0 & 0 & 0 & 0 & \ldots & 0 & 0 \\ \vdots & \vdots & \ddots & \vdots & \vdots & \vdots & \vdots & \ddots & \vdots & \vdots \\ 0 & 0 & \ldots & 0 & 0 & 0 & 0 & \ldots & 0 & 0 \\ 0 & 0 & \ldots & 0 & 0 & -1 & 0 & \ldots & 0 & 1 \end{bmatrix}$$

This leads to a reduced computational complexity compared to the direct convolution of the image 11 with the unmodified filter kernel k.

For the calibration pattern 13 having first and second sub-patterns 15, 15', a filter kernel j can be used which is specific for both the first and second sub-pattern 15, 15' at the same and has the following kernel values:

$$j = \begin{bmatrix} 1 & 1 & \ldots & 1 & 1 & -1 & -1 & \ldots & -1 & -1 \\ 1 & 1 & \ldots & 1 & 1 & -1 & -1 & \ldots & -1 & -1 \\ \vdots & \vdots & \ddots & \vdots & \vdots & \vdots & \vdots & \ddots & \vdots & \vdots \\ 1 & 1 & \ldots & 1 & 1 & -1 & -1 & \ldots & -1 & -1 \\ 1 & 1 & \ldots & 1 & 1 & -1 & -1 & \ldots & -1 & -1 \\ -1 & -1 & \ldots & -1 & -1 & 1 & 1 & \ldots & 1 & 1 \\ -1 & -1 & \ldots & -1 & -1 & 1 & 1 & \ldots & 1 & 1 \\ \vdots & \vdots & \ddots & \vdots & \vdots & \vdots & \vdots & \ddots & \vdots & \vdots \\ -1 & -1 & \ldots & -1 & -1 & 1 & 1 & \ldots & 1 & 1 \\ -1 & -1 & \ldots & -1 & -1 & 1 & 1 & \ldots & 1 & 1 \end{bmatrix}$$

The corresponding modified filter kernel j', which can alternatively be used for convolution of the integral image (instead convolving the image 11 with the unmodified filter kernel j) to reduce the computational complexity, has the following kernel values:

$$j' = \begin{bmatrix} 1 & 0 & \ldots & 0 & -1 & -1 & 0 & \ldots & 0 & 1 \\ 0 & 0 & \ldots & 0 & 0 & 0 & 0 & \ldots & 0 & 0 \\ \vdots & \vdots & \ddots & \vdots & \vdots & \vdots & \vdots & \ddots & \vdots & \vdots \\ 0 & 0 & \ldots & 0 & 0 & 0 & 0 & \ldots & 0 & 0 \\ -1 & 0 & \ldots & 0 & 1 & 1 & 0 & \ldots & 0 & -1 \\ -1 & 0 & \ldots & 0 & 1 & 1 & 0 & \ldots & 0 & -1 \\ 0 & 0 & \ldots & 0 & 0 & 0 & 0 & \ldots & 0 & 0 \\ \vdots & \vdots & \ddots & \vdots & \vdots & \vdots & \vdots & \ddots & \vdots & \vdots \\ 0 & 0 & \ldots & 0 & 0 & 0 & 0 & \ldots & 0 & 0 \\ 1 & 0 & \ldots & 0 & -1 & -1 & 0 & \ldots & 0 & 1 \end{bmatrix}$$

Figure 2:
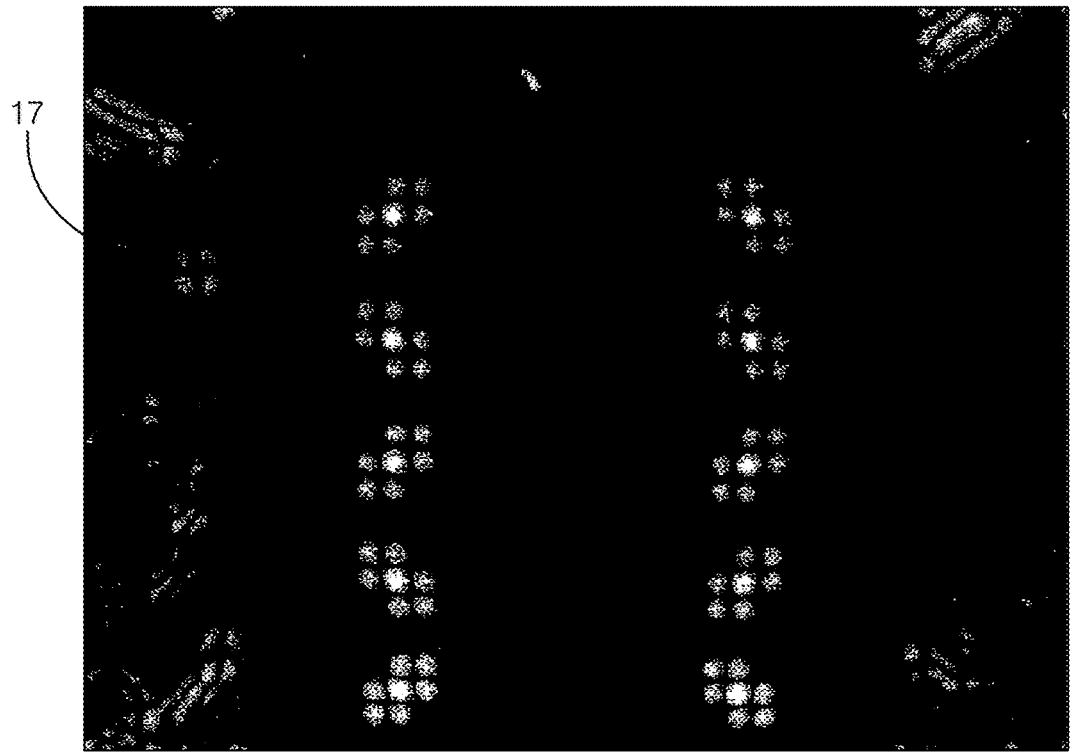
FIG. 2 is a filtered image from a camera in accordance with one embodiment.

With such a filter kernel j or such a modified filter kernel j', the image 11 is transformed into a filtered image 17 shown in FIG. 2. As can be seen from FIG. 2, corners of the squares of the first and second sub-pattern 15, 15' of the calibration pattern 13 appear as bright dots against a dark background in the filtered image 17. The position of a corner of a square can then be determined from the respective spot, in particular as an average position over the pixels of the spot weighted by their pixel values.

Figure 3:
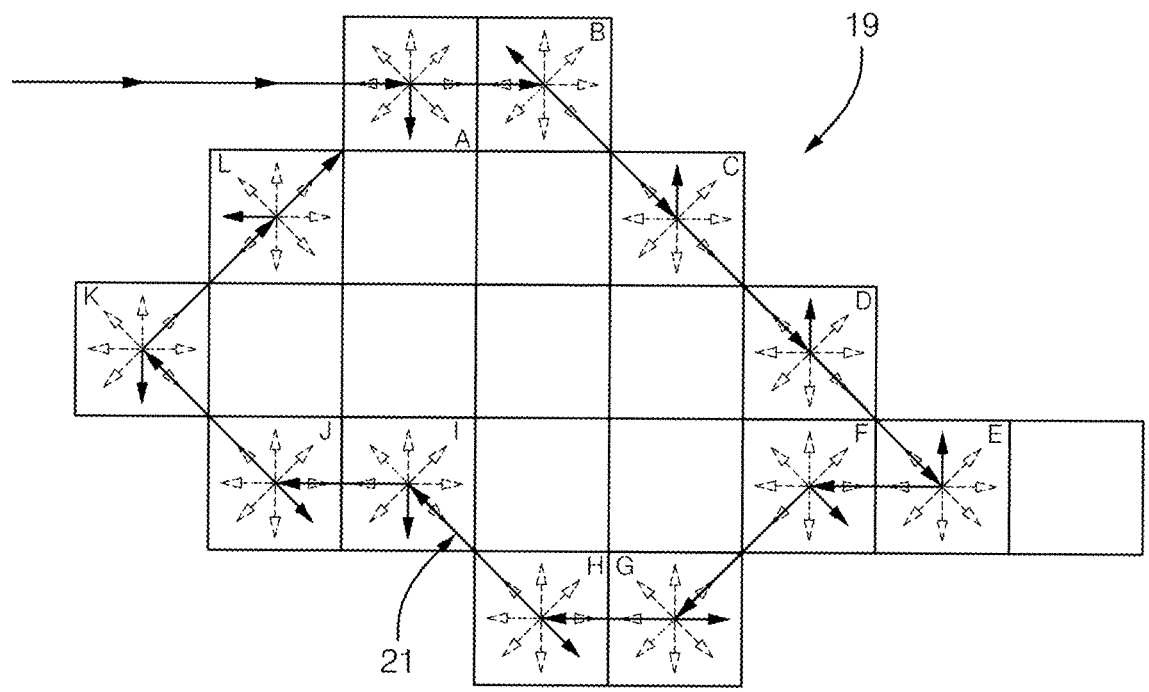
FIG. 3 is an illustration of a spot contour tracing in accordance with one embodiment.

The spots in the filtered image 17 can be determined by the spot contour tracing algorithm, which is described above and is for a single spot 19 schematically shown in FIG. 3. In this Figure, the spot 19 comprises pixels shown as bordered squares.

When, during scanning of the filtered image 17 line by line and pixel by pixel, the pixel A having a pixel value above some threshold is reached, the spot contour tracing starts and moves around the spot 19 as shown by the arrows connecting the pixels of the contour 21. For each of the pixels of the contour, the respective next pixel to move to is searched for in every possible direction (eight directions as indicated by the short arrows in the pixels A to L of the contour 21). The eight neighboring pixels of the respective pixel are evaluated clockwise with regard to whether their pixel value is above the threshold while the pixel value of the preceding pixel (with respect to the clockwise direction of rotation) is not above the threshold. The latest neighboring pixel for which this condition is met, is chosen as the next pixel. In this manner, the entire contour 21 is traced.

After the spot 19 has been traced and maybe its central point has been determined, the spot 19 is removed from the filtered image 17 so as not to be traced again by the then resumed scanning of the filtered image 17.

Figure 4:
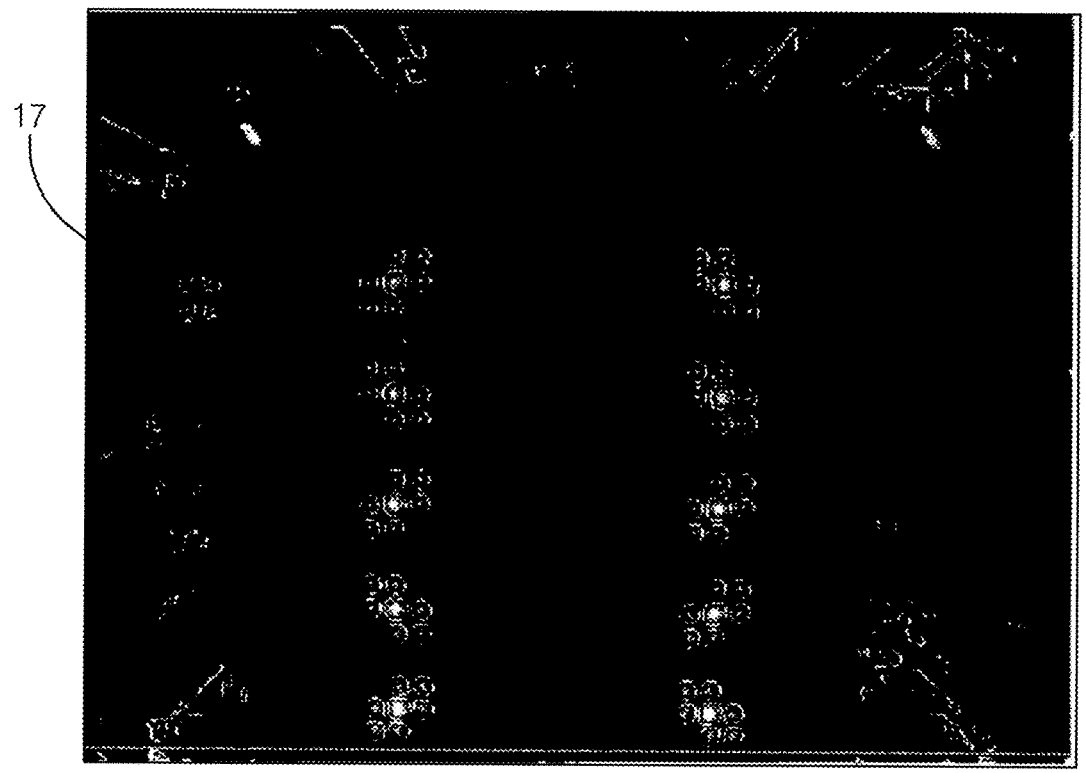
FIG. 4 is a scan through the filtered image of FIG. 2 in accordance with one embodiment.

The result of scanning through the filtered image 17 and tracing all the spots 19 found therein is shown in FIG. 4. This Figure shows the filtered image 17 of FIG. 2 overlayed by the determined contours of respective spots 19. As can be seen from FIG. 4, the spots 19 are reliably identified, though structures in the background of the calibration pattern 13 (cf. FIG. 1) lead to false positives, especially in a periphery of the filtered image 17. Nevertheless, the described method allows identifying candidate points which are at least possible characteristic points of the calibration pattern 13, with these candidate points being identifiable with sub-pixel position by averaging a respective spot 19. Therefore the method, which requires comparatively little computing power, can be used as an important preprocessing of the image 11 for a method which subsequently selects from the set of candidate points the true characteristic points of the calibration pattern 13.

The invention claimed is:

1. A method for identification of candidate points as possible characteristic points of a calibration pattern within an image of the calibration pattern, the method comprising the steps of:
    determining spots within a filtered image derived from the image of the calibration pattern, with a spot being defined as a coherent set of pixels of the filtered image having pixel values exceeding a threshold,
    for each determined spot calculating a central point of the determined spot, and
    identifying as candidate points all calculated central points,
    wherein the step of determining the spots comprises scanning the filtered image one pixel of the filtered image after another,
    wherein, if a scanned pixel has a pixel value exceeding the threshold, the scanning is paused and a spot contour tracing is executed starting with the last scanned pixel as current pixel and the second last pixel as previous pixel,
    the spot contour tracing comprising as a tracing step the steps of logging the current pixel as a contour pixel,
    for neighboring pixels adjacent to the current pixel, evaluating the condition, whether both the neighboring pixel has a pixel value exceeding the threshold and another neighboring pixel, which immediately precedes this neighboring pixel with respect to a sense of rotation around the current pixel, has a pixel value not exceeding the threshold,
    selecting from all neighboring pixels, for which the condition is fulfilled, the neighboring pixel farthest from the previous pixel with respect to said sense of rotation, and
    defining the current pixel as previous pixel and defining the selected neighboring pixel as current pixel;
    the spot contour tracing further comprising the steps of repeating the tracing step until the current pixel is again equal to the last scanned pixel,
    determining the spot as the set of pixels comprising the logged contour pixels and the pixels surrounded by the logged contour pixels.

2. The method in accordance with claim 1, wherein calculating the central point of a determined spot comprises the steps of
    determining a first coordinate of the central point by calculating the sum of the products of a respective first coordinate and a respective pixel value of each of the pixels of the spot and dividing this sum by the sum of the pixel values of the pixels of the spot, and
    determining a second coordinate of the central point by calculating the sum of the products of a respective second co-ordinate and a respective pixel value of each of the pixels of the spot and dividing this sum by the sum of the pixel values of the pixels of the spot.

3. The method in accordance with claim 1, wherein the filtered image is derived from a smoothed image obtained from the image of the calibration pattern by, for each pixel of the image of the calibration pattern; replacing a pixel value of the pixel by an average over the pixel values of pixels in a vicinity of the pixel.

4. The method in accordance with claim 1, wherein the filtered image is obtained from the image of the calibration pattern or a smoothed image derived from the image of the calibration pattern by convolution of the image or the smoothed image, respectively, with a filter kernel specific to the calibration pattern or to a sub-pattern of the calibration pattern.

5. The method in accordance with claim 4, wherein the convolution of the image or the smoothed image comprises the steps of
- obtaining an integral image from the image or the smoothed image by, for each pixel of the image or the smoothed image, replacing the pixel value of the respective pixel by the sum of the pixel values of pixels having smaller first and second coordinates than the respective pixel; and
- convolving the integral image with a modified filter kernel specific to the calibration pattern or to the sub-pattern of the calibration pattern.

6. The method in accordance with claim 5, wherein the modified filter kernel comprises a field of kernel values corresponding to said sub-pattern by the kernel value of a point of the field being
- equal to one, if the point corresponds to a corner of any of the squares and the sum of first and second coordinates of the corner is smaller or greater than each sum of first and second coordinates of the other corners of the same square,
- equal to minus one, if the point corresponds to a corner of any of the squares and the sum of first and second coordinates of the corner is neither smaller nor greater than each sum of first and second coordinates of the other corners of the same square, and
- equal to zero otherwise.

7. The method in accordance with claim 1, wherein the calibration pattern comprises a sub-pattern formed by two equally oriented squares contrasting with a background of the calibration pattern, with a corner of one of the squares coinciding with a corner of the other of the squares.

8. The method in accordance with claim 1, wherein the filter kernel comprises a field of kernel values corresponding to said sub-pattern by the kernel value of a point of the field being
- equal to one, if the point corresponds to any of the squares of the sub-pattern, and
- equal to zero otherwise.

9. The method in accordance with claim 1, wherein the calibration pattern is an arrangement of sub-patterns comprising at least a first sub-pattern and a second sub-pattern, in particular with the second sub-pattern being an inverse of the first sub-pattern.

10. The method in accordance with claim 9, wherein the filtered image is obtained from the image of the calibration pattern or a smoothed image derived from the image of the calibration pattern by
- convolution of the image or the smoothed image with a filter kernel specific to a superposition of the first sub-pattern and the second sub-pattern; and
- after convolution, for each pixel of the image or the smoothed image, replacing a pixel value of the pixel by the absolute value of the pixel value.

11. The method in accordance with claim 10, wherein the convolution of the image or the smoothed image comprises the steps of
- obtaining an integral image from the image or the smoothed image by, for each pixel of the image or the smoothed image, replacing a pixel value of the pixel by the sum of the pixel values of pixels having smaller first and second coordinates than the pixel; and
- convolving the integral image with a modified filter kernel specific to the superposition of the first sub-pattern and the second sub-pattern.

12. The method in accordance with claim 11, wherein the modified filter kernel comprises a field of kernel values corresponding to the superposition of the first sub-pattern and the second sub-pattern by the kernel value of a point of the field being
- equal to one, if the point corresponds to a corner of any of the squares of the first sub-pattern and the sum of first and second coordinates of the corner is smaller or greater than each sum of first and second coordinates of the other corners of the same square,
- equal to minus one, if the point corresponds to a corner of any of the squares of the first sub-pattern and the sum of first and second coordinates of the corner is neither smaller nor greater than each sum of first and second coordinates of the other corners of the same square,
- equal to minus one, if the point corresponds to a corner of any of the squares of the second sub-pattern and the sum of first and second coordinates of the corner is smaller or greater than each sum of first and second coordinates of the other corners of the same square,
- equal to one, if the point corresponds to a corner of any of the squares of the second sub-pattern and the sum of first and second coordinates of the corner is neither smaller nor greater than each sum of first and second coordinates of the other corners of the same square, and
- equal to zero otherwise.

13. The method in accordance with claim 10, wherein the filter kernel comprises a field of kernel values corresponding to the superposition of the first sub-pattern and the second sub-pattern by the kernel value of a point of the field being
- equal to one, if the point corresponds to any of the squares of the first sub-pattern,
- equal to minus one, if the point corresponds to any of the squares of the second sub-pattern, and
- equal to zero otherwise.

14. The method in accordance with claim 9, wherein each of the first and second sub-patterns is formed by two equally oriented squares contrasting with a back-ground of the calibration pattern, with a corner of one of the squares coinciding with a corner of the other of the squares,
- wherein the relative orientation of the two squares of the first sub-pattern is perpendicular to the relative orientation of the two squares of the second sub-pattern.

15. A method for identification of candidate points as possible characteristic points of a calibration pattern within an image of the calibration pattern, the method comprising the steps of:
- determining spots within a filtered image derived from the image of the calibration pattern, with a spot being defined as a coherent set of pixels of the filtered image having pixel values exceeding a threshold;
- calculating for each determined spot a central point of the determined spot; and
- identifying all calculated central points as candidate points; wherein
  - the step of determining the spots comprises scanning the filtered image one pixel of the filtered image after another, and wherein;
  - if a scanned pixel has a pixel value exceeding the threshold, the scanning is paused and a spot contour tracing is executed starting with the last scanned pixel as current pixel and the second last pixel as previous pixel.

16. The method in accordance with claim 15, wherein the spot contour tracing comprising as a tracing step the steps of:
- logging the current pixel as a contour pixel;
- for neighboring pixels adjacent to the current pixel, evaluating the condition, whether both the neighboring pixel has a pixel value exceeding the threshold and another neighboring pixel, which immediately precedes this neighboring pixel with respect to a sense of rotation around the current pixel, has a pixel value not exceeding the threshold;

selecting from all neighboring pixels, for which the condition is fulfilled, the neighboring pixel farthest from the previous pixel with respect to said sense of rotation; and defining the current pixel as previous pixel and defining the selected neighboring pixel as current pixel.

17. The method in accordance with claim 15, wherein the spot contour tracing further comprising the steps of:

repeating the tracing step until the current pixel is again equal to the last scanned pixel; and determining the spot as the set of pixels comprising the logged contour pixels and the pixels surrounded by the logged contour pixels.

18. A system for identification of candidate points as possible characteristic points of a calibration pattern within an image of the calibration pattern, the system comprising:

an image of a calibration pattern captured by a camera mounted to a vehicle; and a microcontroller in communication with the camera, the microcontroller configured to:

determine spots within a filtered image derived from the image of the calibration pattern, with a spot being defined as a coherent set of pixels of the filtered image having pixel values exceeding a threshold;

calculate for each determined spot a central point of the determined spot; and identify all calculated central points as candidate points; wherein the microcontroller is further configured to determine the spots by scanning the filtered image one pixel of the filtered image after another; and wherein if a scanned pixel has a pixel value exceeding the threshold, the microcontroller is further configured to pause the scanning and execute a spot contour tracing starting with the last scanned pixel as current pixel and the second last pixel as previous pixel.

19. The system in accordance with claim 18, wherein the microcontroller is further configured to:

log the current pixel as a contour pixel;

for neighboring pixels adjacent to the current pixel, evaluate the condition, whether both the neighboring pixel has a pixel value exceeding the threshold and another neighboring pixel, which immediately precedes this neighboring pixel with respect to a sense of rotation around the current pixel, has a pixel value not exceeding the threshold;

select from all neighboring pixels, for which the condition is fulfilled, the neighboring pixel farthest from the previous pixel with respect to said sense of rotation; and define the current pixel as previous pixel and defining the selected neighboring pixel as current pixel.

20. The system in accordance with claim 18, wherein the microcontroller is further configured to:

repeat the tracing step until the current pixel is again equal to the last scanned pixel; and determine the spot as the set of pixels comprising the logged contour pixels and the pixels surrounded by the logged contour pixels.

* * * * *